(12) United States Patent
Sirotich et al.

(10) Patent No.: US 8,102,377 B2
(45) Date of Patent: Jan. 24, 2012

(54) PORTABLE INTERACTIVE MEDIA PRESENTATION SYSTEM

(75) Inventors: Robert Sirotich, Calgary (CA); Joe Wright, Strathmore (CA)

(73) Assignee: SMART Technologies ULC, Calgary, Alberta (CA)

(*) Notice: Subject to any disclaimer, the term of this patent is extended or adjusted under 35 U.S.C. 154(b) by 910 days.

(21) Appl. No.: 11/855,726

(22) Filed: Sep. 14, 2007

(65) Prior Publication Data

US 2009/0073129 A1 Mar. 19, 2009

(51) Int. Cl.
*G06F 3/041* (2006.01)
(52) U.S. Cl. .................................................... 345/173
(58) Field of Classification Search .................. 345/156, 345/157, 166, 173, 175, 176; 356/614–624
See application file for complete search history.

(56) References Cited

U.S. PATENT DOCUMENTS

| | | | | |
|---|---|---|---|---|
| 6,803,906 | B1* | 10/2004 | Morrison et al. | 345/173 |
| 6,972,401 | B2* | 12/2005 | Akitt et al. | 250/221 |
| 7,164,782 | B2* | 1/2007 | Baharav et al. | 382/124 |
| 2002/0030668 | A1* | 3/2002 | Hoshino et al. | 345/175 |
| 2004/0207858 | A1* | 10/2004 | Iwamoto et al. | 356/621 |
| 2005/0162409 | A1* | 7/2005 | Hendriks et al. | 345/173 |
| 2006/0250692 | A1* | 11/2006 | Peterson et al. | 359/443 |
| 2007/0153375 | A1* | 7/2007 | Peterson et al. | 359/443 |

* cited by examiner

*Primary Examiner* — Richard Hjerpe
*Assistant Examiner* — Jeffrey A Parker
(74) *Attorney, Agent, or Firm* — Katten Muchin Rosenman LLP (57) ABSTRACT

A system for providing a portable touch system comprises a bezel having a first and a second end, and a housing that is adapted to receive the first and second end of the bezel such that a display area is bounded by the housing and the bezel. At least one camera system is coupled to the housing and is operable to capture within at least a portion of the display area images of an object located within a field of view of the at least one camera system.

54 Claims, 10 Drawing Sheets

PORTABLE INTERACTIVE MEDIA PRESENTATION SYSTEM

FIELD OF THE INVENTION

The present invention relates generally to interactive presentation systems, and in particular, to a portable interactive media presentation system.

BACKGROUND OF THE INVENTION

Touch systems are well known in the art and typically include a touch screen having a touch surface on which contacts are made using a pointer. Pointer contacts with the touch surface or pointer proximity (e.g., hovering) in relation to the touch surface are both detected and used to generate corresponding output pointer position data representing areas of the touch surface where the pointer is located either via contact or proximity. There are basically two general types of touch systems available and they can be broadly classified as "active" touch systems and "passive" touch systems.

Active touch systems allow a user to generate pointer position data by contacting the touch surface with a special pointer that usually requires some form of on-board power source, typically batteries. The special pointer emits signals such as infrared light, visible light, ultrasonic frequencies, electromagnetic frequencies, etc. that activate the touch surface.

Passive touch systems allow a user to generate pointer position data by contacting the touch surface with a passive pointer and do not require the use of special pointers in order to activate the touch surface. A passive pointer can be a finger, a cylinder of some material, or any other suitable object that can be used to contact some predetermined area of interest on the touch surface. Since special active pointers are not necessary in passive touch systems, battery power levels and/or pointer damage, theft, or pointer misplacement are of little concern to users.

Regardless of whether active or passive touch systems are utilized, each touch system may be adapted for use in relation to displays of varying sizes, which may depend on, for example, the size of the conference proceeding and the location (e.g., room, hall, etc.) that it is held. When such events are held at presentation locations that do not have resident touch systems, it is necessary to transport the touch system to the location, deploy it, pack the touch system up at the end of the event, and then remove the touch system from the presentation location. This should all be done in a manner that facilitates both the safe transportation and the efficient deployment/removal of the touch system, while at the same time exhibiting reliable operability.

For example, U.S. Patent Application Publication No. 2007/0109278 to Moon describes an input apparatus and method in a portable terminal. The apparatus includes a display unit having pixels, an optical sensing unit for forming a grid corresponding to the pixels and producing location information of a pointer in the grid, a coordinate converter for converting the location information into coordinate information and computing a location of a cursor based on the coordinate information, and a controller for displaying the cursor at the computed location. The method includes identifying an operation mode of the input apparatus, and if the mode is a key input mode, operating optical sensors for key recognition, displaying a soft keypad, identifying an input location in response to a user input, finding a key value corresponding to the identified input location, and processing the found key value. If the mode is a cursor input mode, the method operates optical sensors for cursor recognition, displays a cursor wait screen, identifies an input location in response to a user input, computes coordinate values corresponding to the identified input location and finds a pixel corresponding to the coordinate values, and changes a color of the found pixel.

U.S. Patent Application Publication No. 2004/0246229 to Yamada describes an information display system comprising an information processing apparatus, an information display apparatus which displays information held in the information processing apparatus on a display surface, and a pointing apparatus which points at an arbitrary position on a display image displayed by the information display apparatus.

U.S. Pat. No. 7,202,860 to Ogawa describes a coordinate input device that includes a pair of cameras positioned in an upper left position and an upper right position of a display screen of a monitor that lies close to a plane extending from the display screen of the monitor and views both a side face of an object in contact with a position on the display screen and a predetermined desk-top coordinate detection area to capture the image of the object within the field of view. The coordinate input device also includes a control circuit which calculates the coordinate value of a pointing tool, points to a position within a coordinate detection field, and based on video signals output from the pair of cameras, transfers the coordinate value to a program of a computer.

U.S. Pat. No. 6,947,032 to Morrison et al. describes a system and method for determining pointer contacts on a touch surface including a touch surface to be contacted by a pointer. At least one imaging device having a field of view looks generally along the touch surface. At least one processor communicates with the at least one imaging device and analyzes images acquired by the at least one imaging device to detect the relative positions of a pointer and a reflection of the pointer therein and thereby determine if a pointer contact with the touch surface has been made.

U.S. Pat. No. 6,828,959 to Takekawa et al. describes a coordinate-position input device that has a frame with a reflecting member for recursively reflecting light provided in an inner side from four edges of the frame forming a rectangular form. Two optical units irradiate light to the reflecting members and receive the reflected light. The frame can be detachably attached to a white board via one or more mounting members. The two optical units are located at both ends of any one of frame edges forming the frame, and at the same time the two optical units and the frame body are integrated to each other.

U.S. Pat. No. 7,232,986 to Worthington et al. describes an apparatus for detecting a pointer within a region of interest that includes at least one pair of imaging devices. The imaging devices have overlapping fields of view encompassing the region of interest. At least one light source provides illumination across the region of interest and is within the field of view of at least one of the imaging device. A filter is associated with the at least one imaging device whose field of view sees the light source. The filter blocks light projected by the light source to inhibit the imaging device from being blinded by the projected light.

U.S. Pat. No. 6,128,585 to Greer describes a sensor array that is positioned at a vantage point to detect and calibrate its reference frame to the external reference frame demarcated by light-emitting reference indicia. The sensor array encompasses a wide view calibration field and provides data indicating the spatial position of light sources placed within the calibration field. A tetrahedron framework with light-emitting diodes at the vertices serves as a portable reference target that is placed in front of the feature sensor to be calibrated. The sensor array reads and calibrates the position of the light-emitting diodes at the vertices while the structured light of the feature sensor is projected onto the framework of the reference target. The structured light intersects with and reflects from the reference target, providing the feature sensor with positional and orientation data. This data is correlated to map the coordinate system of the feature sensor to the coordinate system of the external reference frame. A computer-generated virtual image display compares desired and actual sensor positions through a real time feedback system allowing the user to properly position the feature sensor.

It is therefore at least one object of the present invention to provide a novel portable interactive media presentation system.

SUMMARY OF THE INVENTION

Accordingly, in one aspect there is provided a portable touch system comprising:

a bezel having a first and a second end;

a housing adapted to receive the first and second end of the bezel such that a display area is bounded by the housing and the bezel; and at least one camera system coupled to the housing, wherein the at least one camera system is operable to capture within at least a portion of the display area images of an object located within a field of view of the at least one camera system.

According to another aspect, a method of providing media presentations using a portable touch system is provided. The method comprises:

positioning a housing including touch system components substantially adjacent a surface; and coupling a bezel to the housing; thereby to form a touch surface on a region of the surface bound within the inner periphery of the bezel and the housing.

According to yet another aspect, a method of providing media presentations using a portable touch system is provided. The method comprises:

providing a bezel having a first and a second end;

providing a housing for receiving the first and second end of the bezel;

providing a display area bound by the housing and the bezel; and providing at least one camera system coupled to the housing, wherein the at least one camera system is operable to capture within at least a portion of the display area, images of an object located within a field of view of the at least one camera system.

BRIEF DESCRIPTION OF THE DRAWINGS

One or more embodiments will now be described more fully with reference to the accompanying drawings in which.

DETAILED DESCRIPTION OF THE PREFERRED EMBODIMENT

In the following description, an embodiment of a portable interactive media presentation system such as a touch system is provided, whereby among other features, the portable interactive media presentation system facilitates the transportation, deployment, and packing of the interactive media presentation system.

Figure 1:
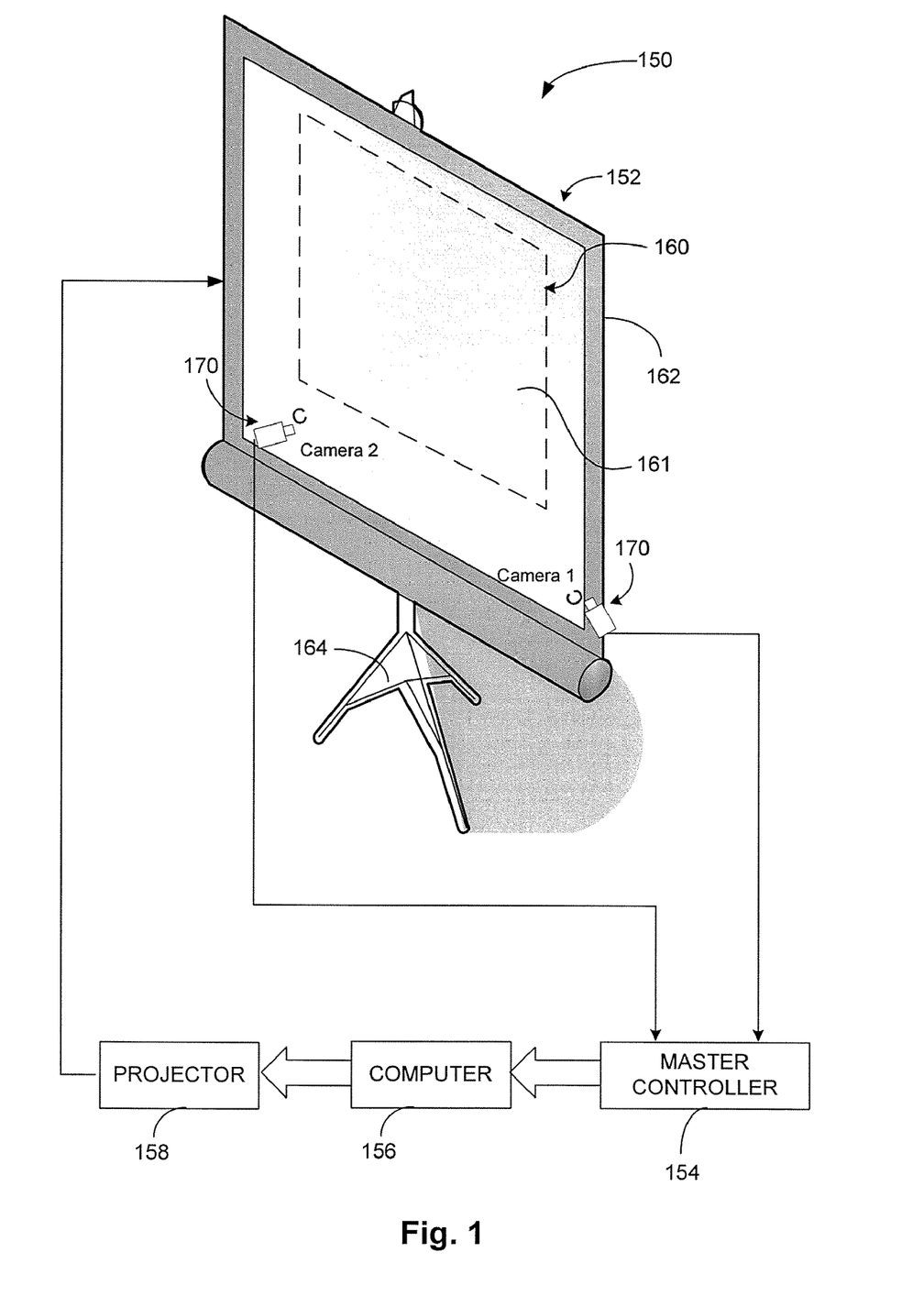
FIG. 1 is a schematic diagram of a camera-based touch system.

Turning now to FIG. 1, an exemplary media presentation system such as camera-based touch system 150 is shown, as disclosed in U.S. Pat. No. 6,803,906 to Morrison et al. and assigned to the assignee of the subject application, the content of which is incorporated by reference herein in its entirety.

As illustrated in FIG. 1, the touch system 150 includes a touch screen 152 that is coupled to a master controller 154 via camera systems 170. The master controller 154 is also coupled to a computer 156 that executes one or more application programs and generates a display that is projected onto a display area 160 of the touch screen 152 via a projector 158. The touch screen 152, master controller 154, computer 156 and projector 158 form a closed-loop so that user-contacts with the touch screen 152 can be recorded as writing or drawing, or used to control execution of application programs executed by the computer 156. Although display area 160 is formed using a frame structure 162 and stand 164, other media may be utilized in order to provide the display area. For example, a portion of a floor, ceiling, wall, or any other suitable substrate may be used to form the display area on which the projected display from projector 158 is presented. At least a portion of the display area 160 within the field of view of the camera systems 170 may be designated as a touch screen 161, which enables a user to interact with the touch system 150 via, for example, applying contact to one or more points on the touch screen 161. In some instances, the entire display 160 area may form the touch screen, while according to other instances only a portion of the display area is designated as the touch screen.

Figure 2:
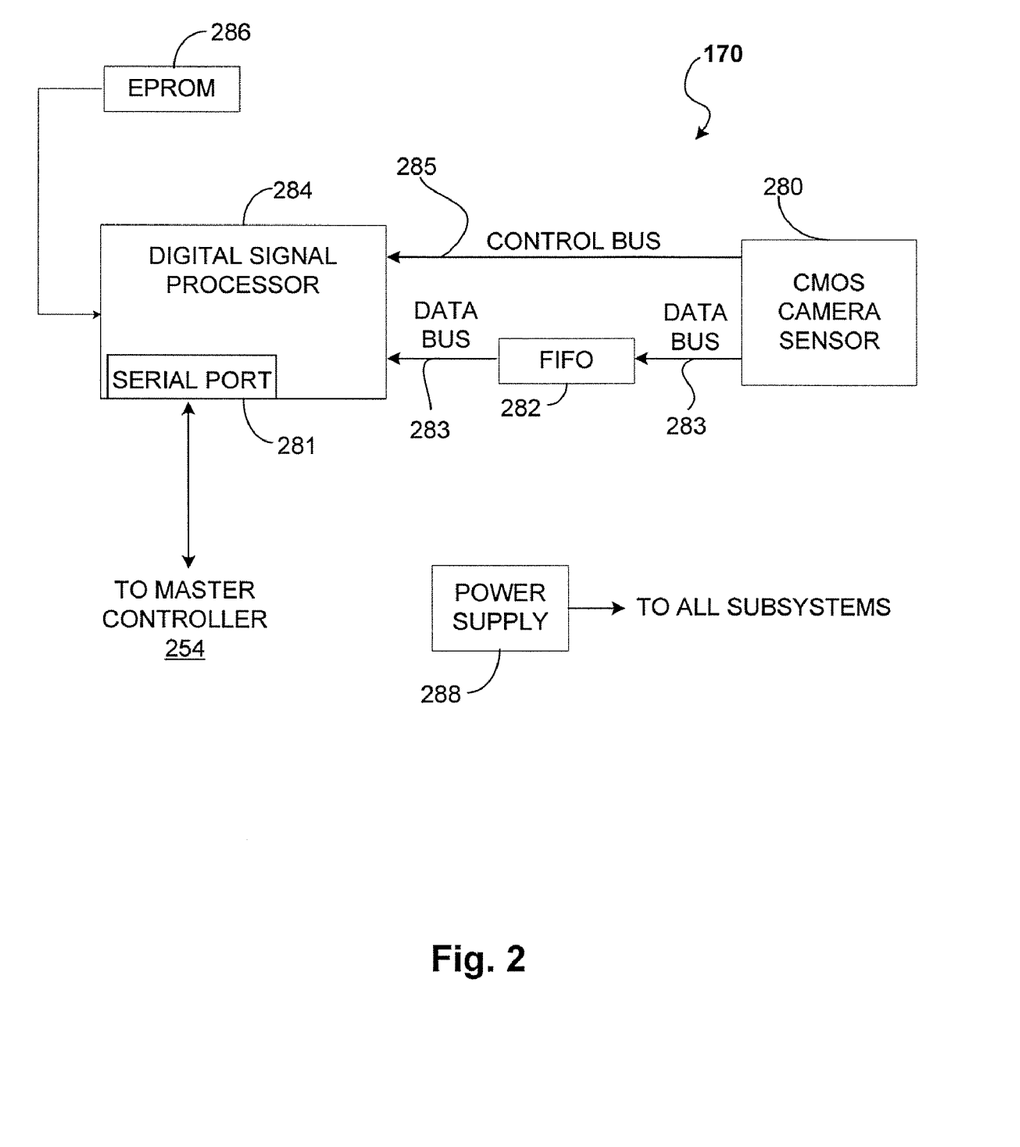
FIG. 2 is a schematic diagram of a camera system forming part of the touch system of FIG. 1.

Referring to FIG. 2, each camera system 170 (FIG. 1) includes a two-dimensional CMOS camera image sensor and associated lens assembly 280, a first-in-first-out (FIFO) buffer 282 coupled to the image sensor and lens assembly 280 by a data bus, and a digital signal processor (DSP) 284 coupled to the buffer 282 by a data bus 283 and to the image sensor and lens assembly 280 by a control bus 285. A boot EPROM 286 and a power supply subsystem 288 are also included.

The CMOS camera image sensor may include a Photo-bit PB300 image sensor configured for a 20×640 pixel sub-array that can be operated to capture image frames at high rates including those in excess of 200 frames per second. For example, the FIFO buffer 282 and DSP 284 may both be manufactured by Cypress under part number CY7C4211V and Analog Devices under part number ADSP2185M, respectively.

The DSP 284 provides control information to the image sensor and lens assembly 280 via the control bus. The control information allows the DSP 284 to control parameters of the image sensor and lens assembly 280 such as exposure, gain, array configuration, reset and initialization. The DSP 284 also provides clock signals to the image sensor and lens assembly 280 to control the frame rate of the image sensor and lens assembly 280. The DSP 284 also communicates image information acquired from the image sensor and associated lens assembly 280 to the master controller 154 (FIG. 1) via serial port 281.

Figure 3:
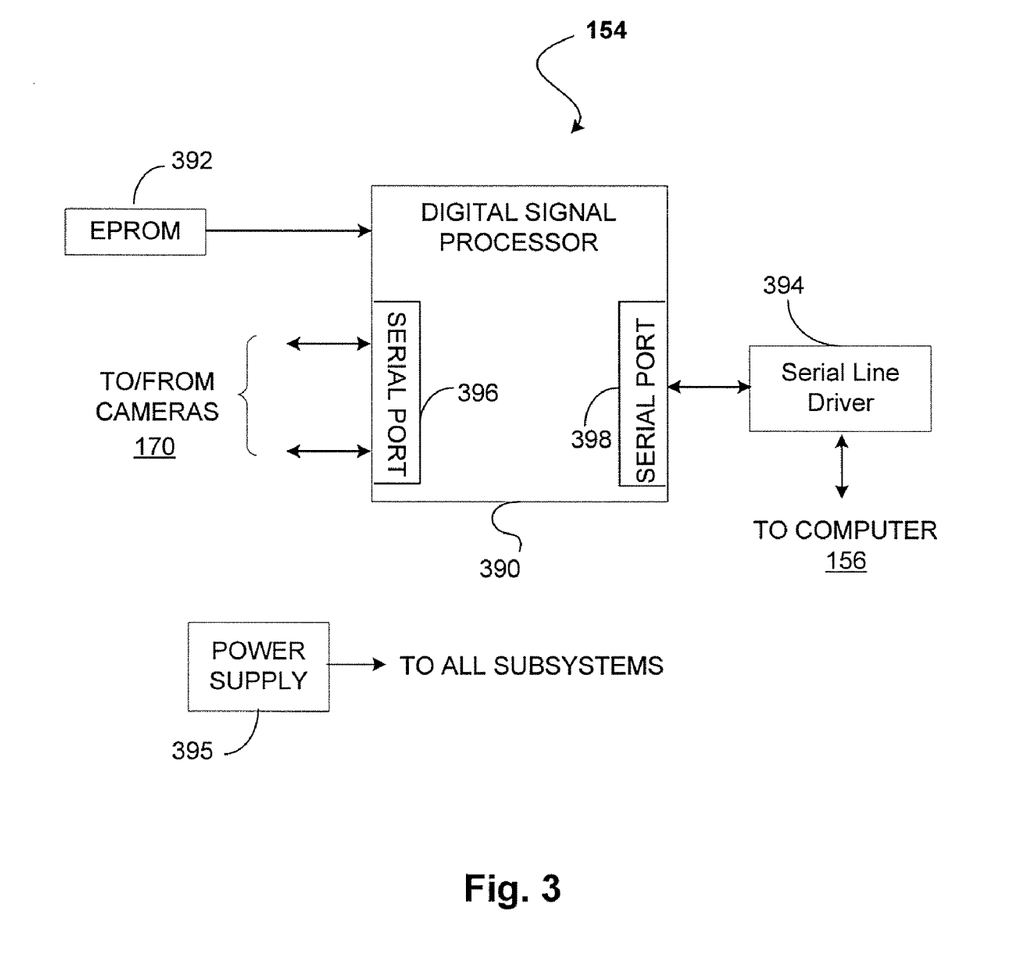
FIG. 3 is a schematic diagram of a master controller forming part of the touch system of FIG. 1.

As illustrated in FIG. 3, master controller 154 (FIG. 1) includes a DSP 390, a boot EPROM 392, a serial line driver 394 and a power supply subsystem 395. The DSP 390 communicates with the DSPs 284 of each of the camera systems 170 over a data bus and via a serial port 396. The DSP 390 also communicates with the computer 156 via a data bus, a serial port 398, and the serial line driver 394. In this embodiment, the DSP 390 is also manufactured by Analog Devices under part number ADSP2185M. The serial line driver 394 is manufactured by Analog Devices under part number ADM222.

The master controller 154 (FIG. 3) and each camera system 170 (FIG. 2) follow a communication protocol that enables bi-directional communications via a common serial cable similar to a universal serial bus (USB). The transmission bandwidth is divided into thirty-two (32) 16-bit channels. Of the thirty-two channels, five (5) channels are assigned to each of the DSPs 284 in the camera system 170 and to the DSP 390 in the master controller 154. The remaining channels are unused and may be reserved for further expansion of control and image processing functionality (e.g., use of additional cameras). The master controller 154 monitors the channels assigned to the camera system DSPs 284 while the DSPs 284 in each of the camera systems 170 monitor the five (5) channels assigned to the master controller DSP 390. Communications between the master controller 154 and each of the camera systems 170 are performed as background processes in response to interrupts.

The general operation of the touch system 150 will now be described with the aid of FIGS. 1-3. Each camera system 170 acquires images of at least the touch screen 161 within the field of view of its image sensor and lens assembly 280 at the frame rate established by the DSP clock signals and processes the images to determine if a pointer is in the acquired images. If a pointer is in the acquired images, the images are further processed to determine characteristics of the pointer contacting or hovering above the touch screen 161 (FIG. 1). The contacting of the pointer with touch screen 161 is detected by the camera systems 170 as one or more dark or illuminated regions that are created by generating a contrast difference at the point of contact of the pointer with the touch screen 161. For example, the point of contact of the pointer may appear darker against the background region of the touch screen 161. Alternatively, according to another example, the point of contact of the pointer may appear illuminated relative to the background region of touch screen 161. Pixel information associated with the one or more illuminated (or dark) regions received is captured by the image sensor and lens assembly 280 and then processed by the camera DSPs 284. Pointer characteristics corresponding to pointer contact with the touch screen 161 are converted into pointer information packets (PIPs) and the PIPs are queued for transmission to the master controller 154. Each of the camera systems 170 also receives and responds to diagnostic PIPs generated by the master controller 154.

The master controller 154 polls each of the camera systems 170 at a set frequency (in this embodiment 70 times per second) for PIPs and triangulates pointer characteristics (e.g., pointer contact) in the PIPs to determine pointer position data. The master controller 154 in turn transmits pointer position data and/or status information to the personal computer 156. In this manner, the pointer position data transmitted to the personal computer 156 can be recorded as writing (e.g., annotations), drawing, executing a response, or can be used to control execution of application programs executed by the computer 156. The computer 156 also updates the display output conveyed to the projector 158 so that information projected onto the touch screen 161 reflects the pointer activity.

Figure 4:
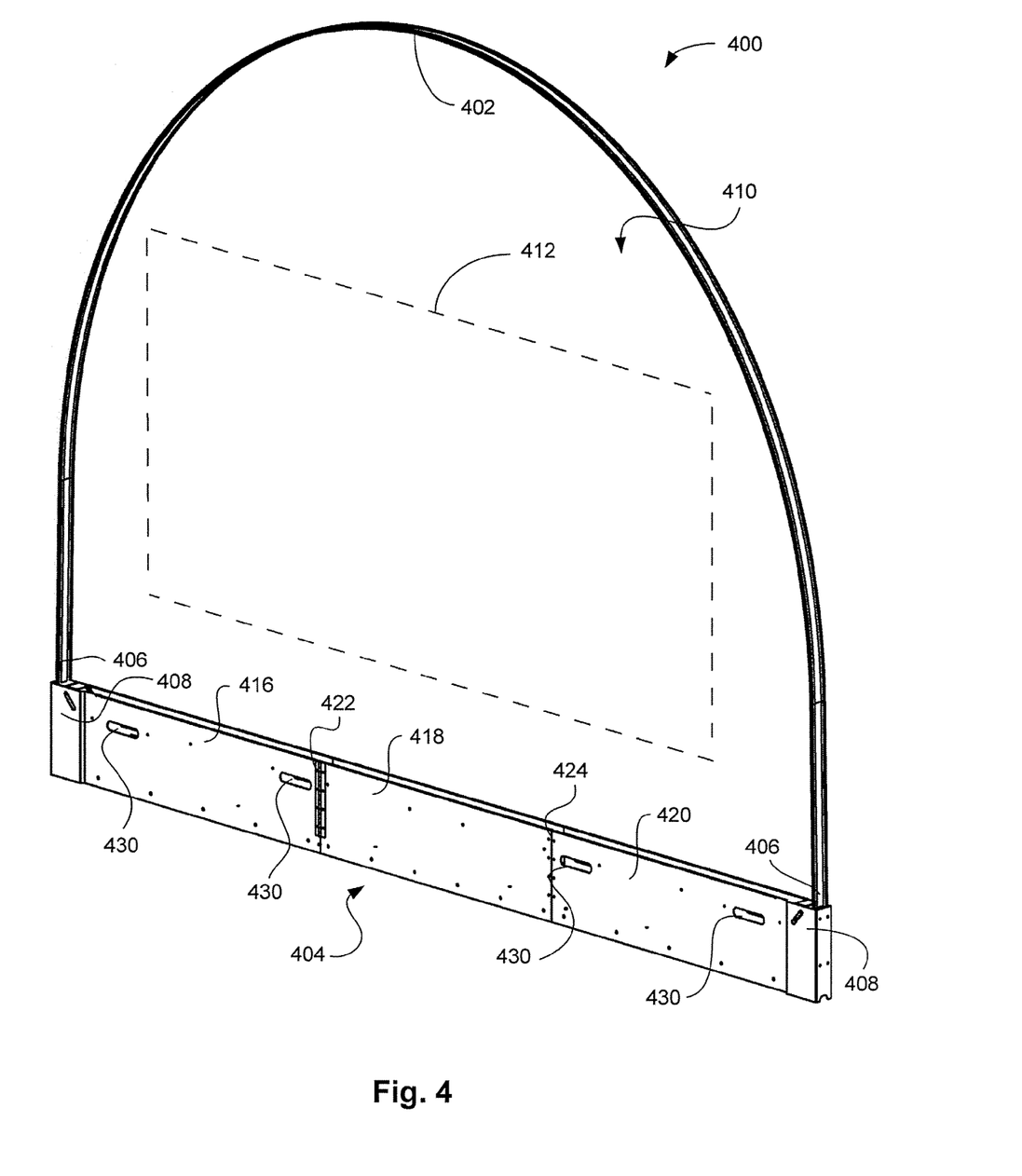
FIG. 4 is a perspective view of a portable touch system.

Turning now to FIG. 4, a portable camera-based touch system 400 is provided. Portable camera-based touch system 400 comprises a flexible bezel 402 and a housing 404. The end portions 406 of the bezel 402 include pins that are insertable into the end regions 408 of housing 404 such that when attached, a display area 410 is created within the boundary delineated by the bezel 402 and the housing 404. Thus, the created display area 410 may be formed on any substrate such as a screen, wall, floor, ceiling, or other surface. Either the entire display area 410 or a portion of the display area 410 may be utilized as a touch screen 412. Thus, the portable camera-based touch system 400 may be adapted to create a display area and touch screen by positioning the housing 404 and the attached bezel 402 adjacent any surface suitable for receiving a projected image such as the output of a projector.

Portable camera-based touch system 400 may incorporate the components and functionality of the camera-based touch system described in relation to FIGS. 1-3. For example, camera systems 170 (FIG. 2) and master controller 152 (FIG. 3) may be located within housing 404. The display area 160 (FIG. 1) and touch screen 161 (FIG. 1) are formed by establishing a display boundary against any surface, such as a substantially vertical wall, using the bezel 402 and the housing 404. Although the exemplary embodiment describes a touch system incorporating a pair of camera systems, the portable camera-based touch system 400 may incorporate any touch system that is either active or passive and, for example, incorporates the use of one or more camera systems (e.g., a single camera system, a four camera system, etc.). While the display area 410 includes the entire region bounded between the bezel 402 and the housing 404, the touch screen 412 may include either a portion of the display area 410 or the entire display area 410. In the provided example, the touch screen 412 is governed by a region of the display area 410 that the camera systems 170 see and are thus able to detect and process pointer activity (e.g., contact or hovering). Thus, if the camera systems 170 are set-up to capture images across the entire display area 410, then the entire display area becomes the touch screen 412. However, as illustrated, if the camera systems 170 are set-up to capture images across a portion of the display area 410, then the captured portion becomes the touch screen 412.

The housing 404 in this embodiment comprises a plurality of foldable sections such as section 416, section 418, and section 420, where sections 416 and 418 are coupled via hinge 422 and sections 418 and 420 are coupled via hinge 424. Both sections 416 and 420 include handles 430 for facilitating ease of transportation and carrying of the system 400 when the housing 404 is in a folded condition (see FIG. 5A).

Figure 5A:
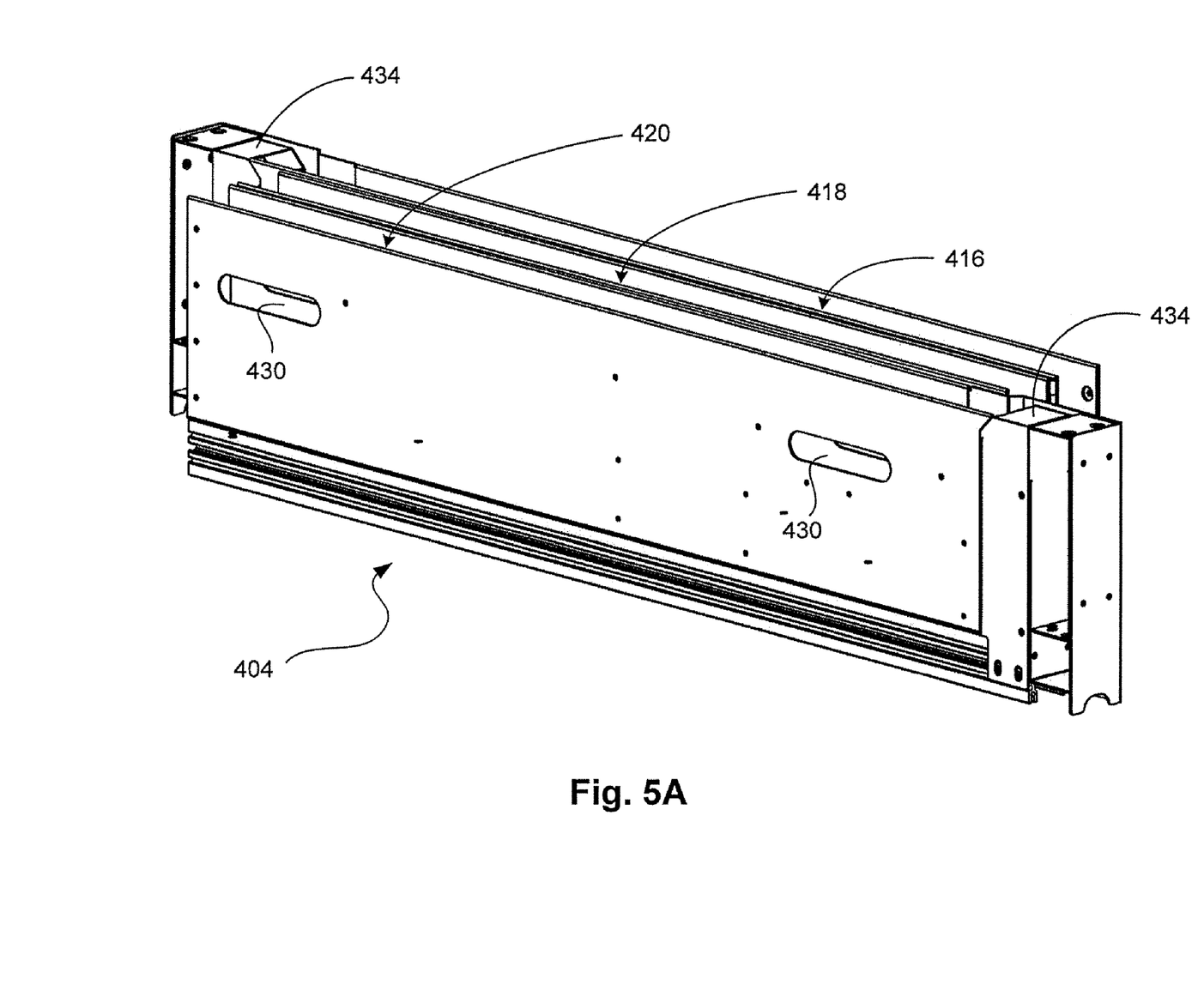
FIG. 5A shows a housing of the portable touch system of FIG. 4 in a folded position.
Figure 5B:
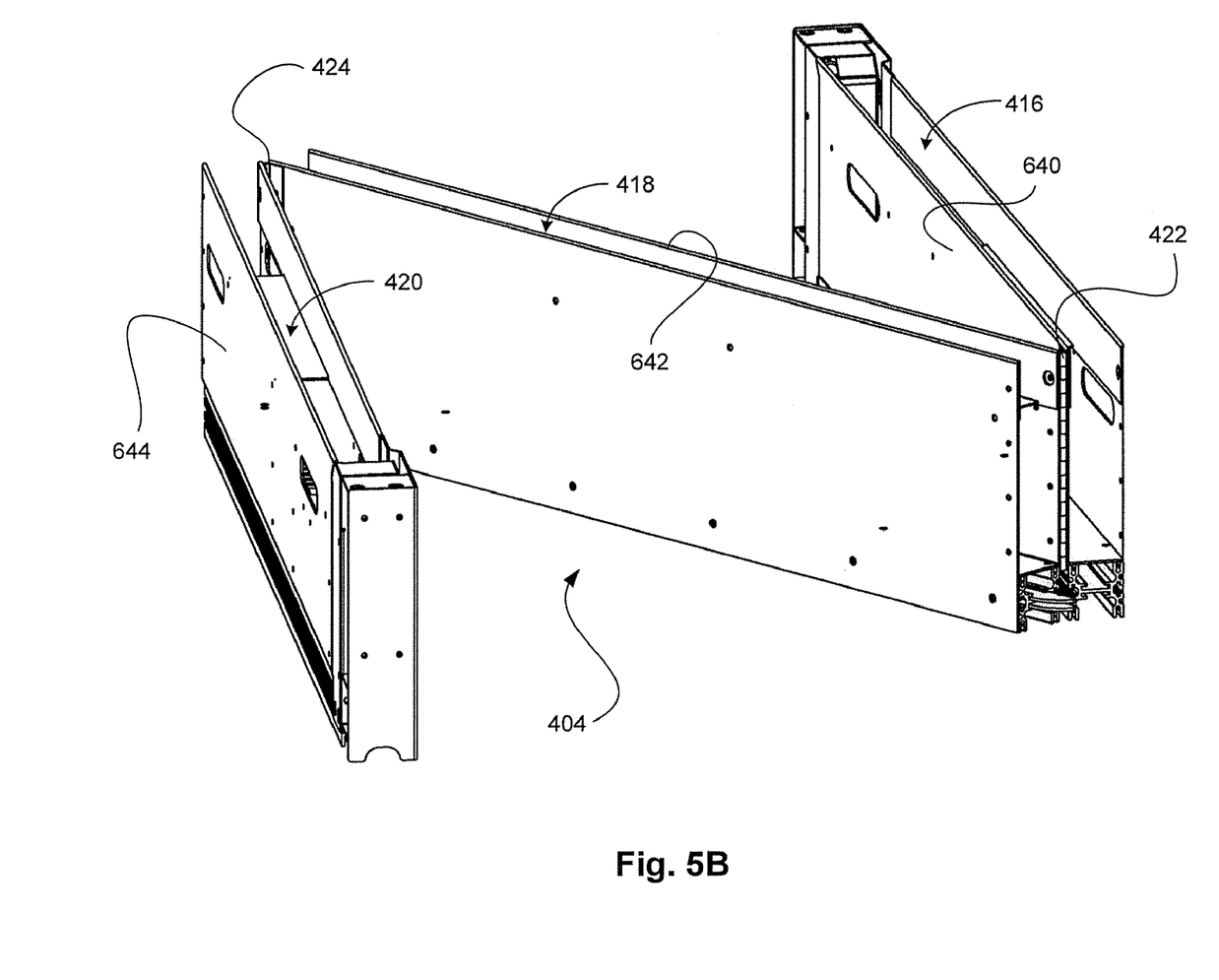
FIG. 5B shows the deployment of the housing shown in FIG. 5A.

FIG. 5A shows the sections 416, 418, and 420 folded onto one another when the portable camera-based touch system 400 is not being deployed for use. As illustrated, the folding capability provides a means for reducing the overall size of the housing 404 so that the system 400 is easily transported between locations using the handles 430 or by other means (e.g., a cart, a trolley, etc.). Openings 434 located at either end of sections 416 and 420 are adapted to receive the ends 406 (FIG. 4) of the bezel 402 (FIG. 4). As shown in FIG. 5B, the housing 404 may be deployed by extending the sections 416-

420 about hinges 422 and 424 until the surfaces 640-644 of sections 416-420 are aligned to be substantially on the same plane (see FIG. 4).

Figure 6:
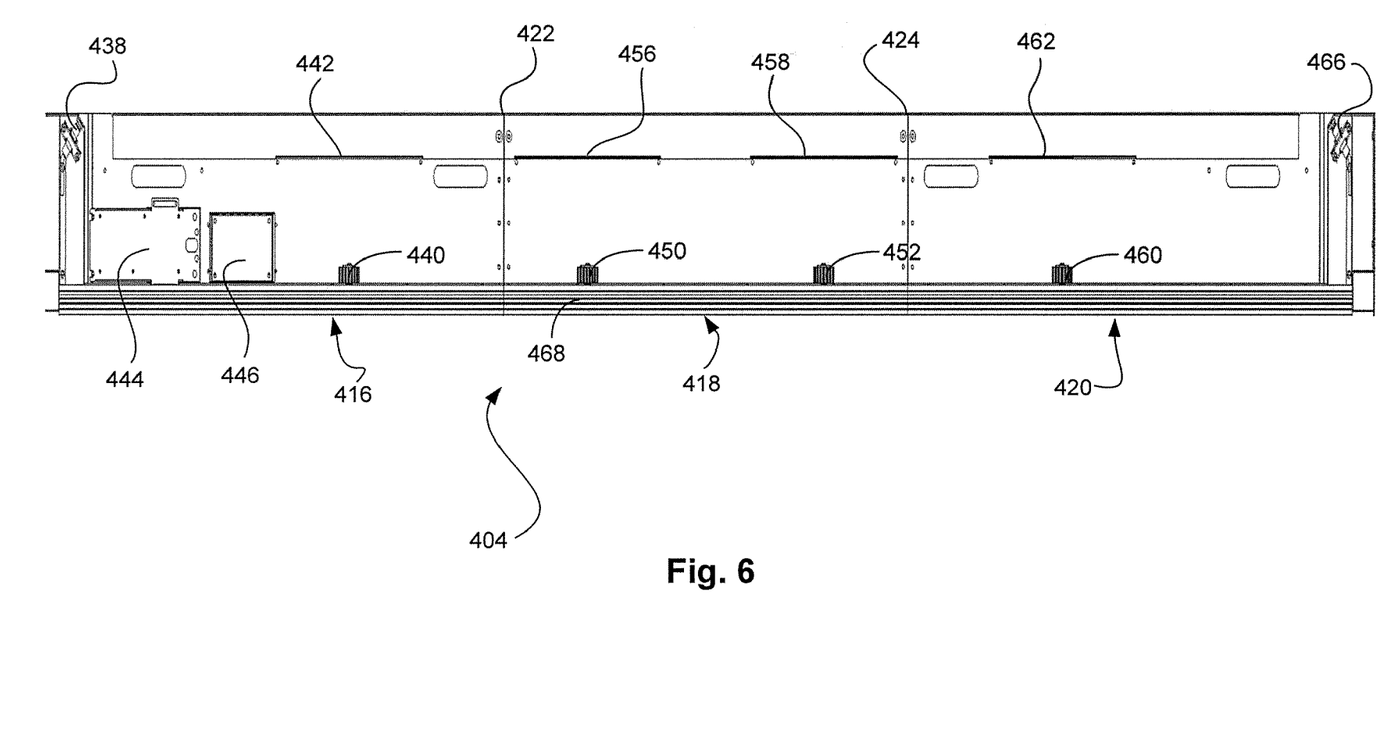
FIG. 6 is a cross-sectional side elevational view of the housing.

Turning now to FIG. 6, a cross-sectional side elevational view of the housing 404 (FIG. 4) is shown. As illustrated, various components are enclosed within the housing 404 in a manner that both facilitates the system's transportation and increases its deployment for use. Section 416 accommodates a first camera device 438, an optical source 440, a lens 442, a signal processing housing 444, and an optical source power supply unit 446.

The camera device 438 is coupled to the end portion of the housing such that the field of view of camera device 438 originates from the bottom corner region of display area 410 (FIG. 4). Camera device 438 includes an image sensor such as the CMOS camera sensor 280 described in relation to FIG. 2. The optical source 440 may include an infrared light emitting diode that is adapted to generate an infrared optical signal for transmission over the display area 410 (FIG. 4) and hence touch screen 412 (FIG. 4). Other optical devices having different operating wavelengths may also be adopted. The lens 442 receives the infrared optical signal from the optical source 440 and distributes the optical signal at least over the touch screen 412 (FIG. 4), in a manner that causes the optical signal to form a substantially collimated beam of infrared light. Lens 442 may include a Fresnel lens or any other type or combination of lens components or assemblies. Lens 442 may be fixed in position or of an adjustable type in order to control the propagation direction and coverage of the optical signal over the display area 410. The signal processing housing 444 may include, among other components and devices, digital signal processor 284, EPROM 286, power supply 288 and master controller 154, as illustrated and described in relation to FIGS. 2 and 3. Power supply unit 446 distributes electrical power to optical source 420 and any other optical source located and operating within housing 404, such as optical sources 450, 452, and 454.

Still referring to FIG. 6, section 418 includes optical sources 450 and 452, and lenses 456 and 458. The optical sources 450-452 and lenses 456-458 within section 418 of the housing 404 are identical to optical source 440 and lens 442 of section 416, which have been described above. Section 420 includes optical source 460, lens 462, and camera device 466. Similarly, the optical source 460, lens 462, and camera device 466 within section 420 of the housing 404 are identical to optical source 440, lens 442, and camera device 438 of section 416, which have been described above. Camera device 466 may also include an image sensor such as the CMOS camera sensor 280 described in relation to FIG. 2.

Camera devices 438 and 466 are each operatively coupled to a processing device such as digital signal processor 284 (FIG. 2). Each camera device 438, 466 and digital signal processor 284 forms a camera system such as camera system 170 (FIG. 2). In some embodiments, for example, each of camera devices 438 and 466 is communicatively coupled to an individual on-board digital signal processor 284, where each individual digital signal processor 284 is adapted to process images that are received from the camera device to which it is coupled. Images associated with camera devices 438 and 466 that are processed by each respective digital signal processor 284 are then coupled to the master controller 154 within the signal processing housing 444 (FIG. 3) for further processing in order to determine pointer position data. In other embodiments, each of camera devices 438 and 466 may be communicatively coupled to a single digital signal processor 284, whereby the single digital signal processor 284 is adapted to process images that are received from both camera devices 438 and 466 and process the images to determine pointer position data obviating the need for a separate master controller.

Figure 7:
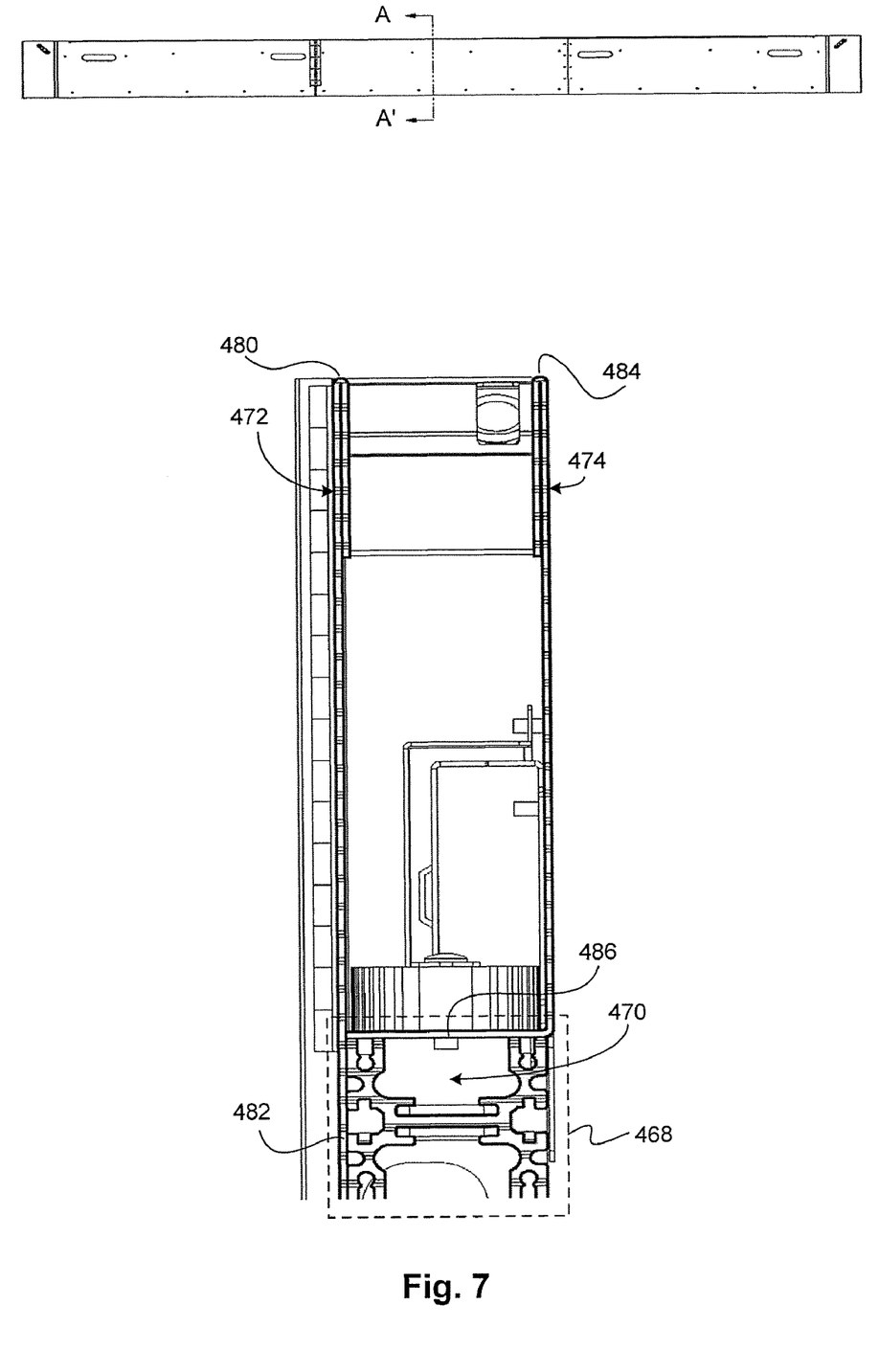
FIG. 7 shows a side elevational view of the housing together with a cross-sectional view taken along line A-A'.

FIG. 7 illustrates primarily a cross-sectional end view of the housing 404, which includes a base 468 that is adapted to provide cable management functionality. Base 468 includes an opening 470 that runs along the length of the housing 404. Using the opening 470, cables and wires distribute signaling and power between the optical sources 440, 450, 452, 460, camera devices 438, 466, signal processing housing 444, and the power supply unit 446. FIG. 7 also illustrates a front metal cladding 472 and a rear metal cladding 474, which provide electromagnetic interference (EMI) shielding for the electrical components (e.g., optical sources, signal processing housing, etc.) enclosed within the housing 404. The shielding reduces electromagnetic radiation emissions to within the designated EMI standards. The front metal cladding 472 extends from the top of the housing 404, as indicated at 480, to the base 468, as indicated at 482. The rear metal cladding 474 extends from the top of the housing 404, as indicated at 484, and covers the opening 470 at the top of base 468, as indicated at 486.

In operation, with the touch system 400 in the deployed condition shown in FIG. 4, optical sources 440, 450, 452, and 460, and respective lenses 442, 456, 458, and 462, collectively generate a curtain of infrared radiation that illuminates at least the touch screen 412 (FIG. 4). The curtain of infrared radiation provides infrared signal coverage to the touch screen 412 such that when an object (e.g., a pointer) intercepts the generated infrared radiation, a change in optical intensity is detected by the camera devices 438 and 466. The optical intensity change depends on the optical characteristics of the bezel 402 (FIG. 4). For example, if the bezel 402 is coated with, or exhibits, anti-infrared reflection (i.e., absorption) properties, the touch screen 412 will appear as a dark background in comparison to any region of the touch screen 412 that is intercepted by an object, since at the interception location, the object is illuminated by the infrared signal and appears as a bright region. Alternatively, according to another example, if the bezel 402 is coated with, or exhibits, retroreflective properties, the touch screen 412 (FIG. 4) will appear as a bright background in comparison to any region of the touch screen 412 that is intercepted by an object, since the object interferes with the retro-reflected optical signals at the interception location and is therefore detected by the cameras as a darker region or point.

Within touch system 400, each camera system 170 (FIG. 2) acquires images of the touch screen 412 and processes the images to determine if an object such as a pointer (e.g., a user's finger) has been detected as an illuminated or darker region within the acquired images. Within each camera system 170, pixel information associated with the detected illuminated or dark regions is captured by the image sensor and lens assembly 280 of camera devices 438 and 466 and then processed by the camera DSPs 284 located within signal processing housing 444. Pointer characteristics corresponding to pointer contact with the touch screen 412 are then converted into pointer information packets (PIPs) and the PIPs are queued for transmission to the master controller 154 (FIG. 3). The master controller 154 polls each of the camera systems 170 for PIPs and triangulates pointer characteristics (e.g., pointer contact or hover) in the PIPs to determine pointer position data. The master controller 154 within the signal processing housing 444 in turn transmits pointer position data and/or status information to the personal computer 156 (FIG. 1). Thus, the pointer position data transmitted to the personal computer 156 can be recorded as writing (e.g., annotations), drawing, executing a response, or can be used to control execution of application programs executed by the computer 156. The computer 156 also updates the display output conveyed to the projector 158 so that information projected onto the touch screen 412 reflects the pointer activity.

Figure 8A:
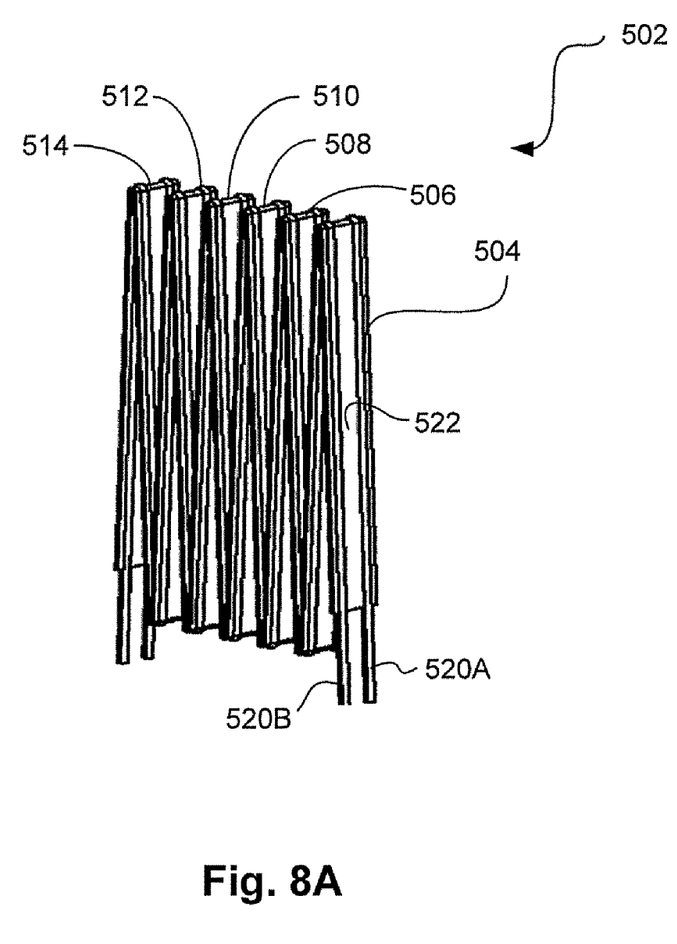
FIG. 8A is a view of an alternative bezel in a folded condition.

Turning now to FIG. 8A, an alternative embodiment of a bezel 502 in a folded, collapsed, or contracted position for use in the touch system 400 is shown. Bezel 502 may be constructed using many different elongate materials using either a single piece or a plurality of connectable or coupled components. For example, the bezel may comprise a plurality of elongate members (e.g., poles) 504-514 that are each constructed from a pair of poles 520A, 520B encapsulated by a pair of channels (not shown) that are sewn into a fabric material 522 (e.g., webbing) capable of exhibiting anti-reflective or retro-reflective properties. The elongate members 504-514 are coupled to each other using hinges (not shown) in order to facilitate the collapsibility/deployment of the bezel 502.

Figure 8B:
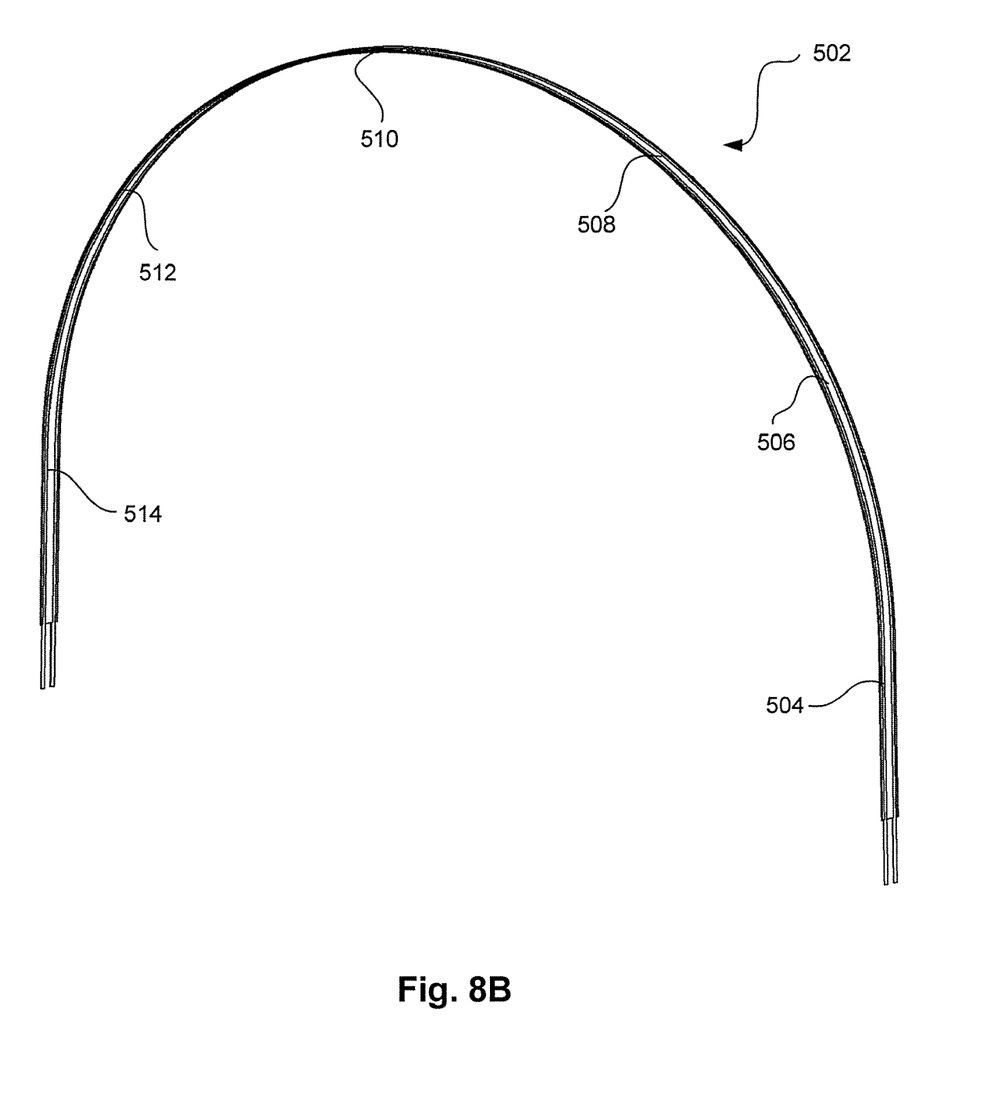
FIG. 8B illustrates the bezel of FIG. 8A in a deployed position.

Referring to FIG. 8B, once the bezel 502 is in the collapsed position (FIG. 8A), it may subsequently be deployed and extended for coupling to housing 404 (FIG. 4) during use. As shown, coupled elongate members 504-514 are manipulated about their hinges to convert the bezel 504 into a deployed position.

Generally, the bezel 502 may include at least two features, which are collapsibility for facilitating storage and transportation, and reflective characteristics for enhancing the detection and processing carried out by a camera system or any other such image detection system used in the detection and acquisition of images associated with a pointer interacting with a touch screen.

According to alternative embodiments, for example, the bezel may also be fabricated through the use of webbing and spring steel. Spring steel ribbon(s) may be encapsulated by a channel in the webbing (i.e., two layers sewn together, or one piece folded over and sewn) to form the bezel. In storage/transportation mode, the spring steel/webbing may be maintained in a coiled state. According to another example, an inflatable bezel may be constructed of an impervious material having a series of air channels for inflation. In one embodiment, the inflatable bezel may be constructed in a manner that allows it to remain inflated while allowing air to escape. According to such a construction, air is continuously fed to the inflatable bezel via an air supply. To collapse the bezel for storage and transportation, the air supply may simply be turned off. According to another embodiment, the inflatable bezel may be adapted to include an air tight construction, such that it needs to be inflated only once. To collapse the bezel for storage and transportation, the bezel is deflated by, for example, manipulating a valve.

Within different bezel embodiments, anti-reflective or retro-reflective properties may be applied to or incorporated within the bezel by, for example, applying a cover having anti-reflective or retro-reflective properties over one or more elongate members, applying an anti-reflective or retro-reflective coating to one or more elongate members, or constructing one or more elongate members from an anti-reflective or retro-reflective material.

Although preferred embodiments of the present invention have been described, those of skill in the art will appreciate that variations and modifications may be made without departing from the spirit and scope thereof as defined by the appended claims.

What is claimed is:

1. A portable touch system, comprising:
    a flexible bezel having a first end and a second end;
    a rigid, elongate housing configured to receive the first and second ends of the bezel at spaced locations therealong such that a display area is bounded by the housing and the bezel, wherein said display area is bounded by said housing only along one side thereof, the remainder of said display area being bounded by said flexible bezel; and
    at least one camera system coupled to the housing, the at least one camera system being configured to capture within at least a portion of the display area images of an object located within a field of view of the at least one camera system, wherein the housing releasably receives the first and second ends of the flexible bezel facilitating detachment of the flexible bezel from the housing.

2. The portable touch system according to claim 1, wherein the portion of the display area comprises a touch surface area.

3. The portable touch system according to claim 2, wherein the at least one camera system comprises at least two camera systems at spaced locations along said housing, said camera systems having overlapping fields of view encompassing at least the touch surface area.

4. The portable touch system according to claim 1, wherein the at least one camera system comprises at least one first processor located within the housing, the at least one first processor configured to receive captured images and generate pixel data associated with the captured images.

5. The portable touch system according to claim 4, further comprising a second processor operatively coupled to the at least one first processor and located within the housing, wherein the second processor receives the generated pixel data and generates location coordinate information associated with the object within the field of view.

6. The portable touch system according to claim 4, wherein the at least one camera system comprises a complementary metal oxide semiconductor (CMOS) camera device for capturing images and conveying the captured images to the at least one first processor.

7. The portable touch system according to claim 1, wherein the flexible bezel includes a non-infrared reflection coating on a face thereof that is within the field of view of the at least one camera system.

8. The portable touch system according to claim 1, wherein the flexible bezel includes a retro-reflecting coating on a face thereof that is within the field of view of the at least one camera system.

9. The portable touch system according to claim 1, wherein the flexible bezel is collapsible when detached from the housing.

10. The portable touch system according to claim 9, wherein the flexible bezel comprises:
    a plurality of hingedly connected elongate members; and
    a cover configured to encapsulate the elongate members.

11. The portable touch system according to claim 10, wherein the cover comprises at least one of a fabric material, a plastic material, and a metallic material.

12. The portable touch system according to claim 1, wherein the housing is collapsible when the flexible bezel is detached from said housing.

13. The portable touch system according to claim 12, wherein the housing comprises at least two sections coupled by a hinge, the at least two sections being moveable relative to one another between an extended condition where said housing is configured to receive the ends of said bezel and a collapsed condition where said sections overlie one another.

14. The portable touch system according to claim 8, further comprising at least one optical source located within the housing, the at least one optical source configured to illuminate at least the portion of the display area.

15. The portable touch system according to claim 14, wherein the at least one optical source comprises an infrared source.

16. The portable touch system according to claim 14, further comprising at least one lens located within the housing, the at least one lens configured to diffuse illumination emitted by said at least one optical source over at least the portion of the display area.

17. The portable touch system according to claim 16, wherein the at least one lens comprises a Fresnel lens.

18. The portable touch system according to claim 14, further comprising a power supply located within the housing, the power supply configured to provide electrical power to the at least one optical source.

19. The portable touch system according to claim 5, further comprising a power supply located within the housing, the power supply configured to provide electrical power to the at least one first processor and the second processor.

20. The portable touch system according to claim 1, wherein the housing comprises a base that is configured to provide cable management.

21. The portable touch system according to claim 1, wherein the housing includes a casing encapsulating a plurality of electrical devices within the housing and providing electromagnetic interference shielding thereto.

22. The portable touch system according to claim 10, wherein the cover comprises webbing.

23. The portable touch system according to claim 1 wherein said flexible bezel is generally arch-shaped when the ends thereof are inserted into said housing.

24. A method of providing media presentations using a portable touch system, the method comprising:
positioning a rigid, elongate housing that accommodates touch system components therein substantially adjacent a surface; and
releasably coupling first and second ends of a flexible bezel to the housing at spaced locations therealong thereby to form a touch surface on at least a portion of the surface bound within the bezel and the housing, wherein the housing bounds only one side of said surface, the remainder of the surface being bounded by said flexible bezel.

25. The method according to claim 24, further comprising illuminating the touch surface with an infrared signal, wherein the infrared signal is generated from within the housing.

26. The method according to claim 25, wherein the flexible bezel absorbs the infrared signal and wherein the method further comprises capturing an image looking generally across the touch surface and detecting an object interacting with the touch surface as an illuminated region within the captured image.

27. The method according to claim 25, wherein the flexible bezel retro-reflects the infrared signal and wherein the method further comprises capturing an image looking generally across the touch surface and detecting an object interacting with the touch surface as a dark region within the captured image.

28. The method according to claim 26, further comprising determining a coordinate position associated with the detected illuminated region.

29. The method according to claim 28, further comprising processing the determined coordinate position associated with the detected illuminated region and updating an image presented on said touch surface.

30. The method according to claim 27, further comprising determining a coordinate position associated with the detected dark region.

31. The method according to claim 30, further comprising processing the determined coordinate position associated with the detected dark region and updating an image presented on said touch surface.

32. A portable touch system comprising:
a rigid, elongate housing having laterally spaced camera devices therein; and
a flexible bezel having opposite ends, each end of said bezel having formations thereon, the formations being releasably inserted into complimentary formations in said housing adjacent a respective end thereof so that the housing and bezel bound a region of interest, wherein said housing bounds only one side of said region of interest, the remainder of said region of interest being bounded by said flexible bezel, said camera devices capturing images of said region of interest from different vantages.

33. The portable touch system according to claim 32 wherein said housing is collapsible when the ends of said flexible bezel are removed from said housing.

34. The portable touch system according to claim 33 wherein the camera devices are positioned adjacent opposite ends of said housing.

35. The portable touch system according to claim 34, wherein the housing comprises at least two sections coupled by a hinge, the at least two sections being moveable relative to one another between an extended condition where said housing is configured to receive the ends of said flexible bezel and a collapsed condition where said sections overlie one another.

36. The portable touch system according to claim 35 wherein said housing comprises at least three sections coupled by hinges.

37. The portable touch system according to claim 33, wherein the flexible bezel includes a non-infrared reflection coating on a face thereof that is within the fields of view of the camera devices.

38. The portable touch system according to claim 33, wherein the flexible bezel includes a retro-reflecting coating on a face thereof that is within the fields of view of the camera devices.

39. The portable touch system according to claim 33, wherein the flexible bezel is collapsible when detached from the housing.

40. The portable touch system according to claim 39, wherein the flexible bezel comprises:
a plurality of hingedly connected elongate members; and
a cover configured to encapsulate the elongate members.

41. The portable touch system according to claim 40, wherein the cover comprises at least one of a fabric material, a plastic material, and a metallic material.

42. The portable touch system according to claim 33, further comprising a power supply located within the housing, the power supply configured to provide electrical power to the camera devices.

43. The portable touch system according to claim 33, wherein the housing comprises a base that is configured to provide cable management.

44. The portable touch system according to claim 33, wherein the housing comprises a casing encapsulating a plurality of electrical devices within the housing and providing electromagnetic interference shielding thereto.

45. The portable touch system according to claim 32 wherein each camera device comprises an image sensor and associated processor, each processor processing image data acquired by the associated image sensor to identify an object appearing in captured image frames.

46. The portable touch system according to claim 45 further comprising processing structure receiving object data from the camera device processors and generating coordinates representing the position of the object within the region of interest.

47. The portable touch system according to claim 32 wherein said flexible bezel comprises pins at its ends that are received by complimentary holes in said housing.

48. The portable touch system according to claim 47 wherein said housing is collapsible when the ends of said flexible bezel are removed from said housing.

49. The portable touch system according to claim 48 wherein the camera devices are positioned adjacent opposite ends of said housing.

50. The portable touch system according to claim 46, wherein the flexible bezel includes a non-infrared reflection coating on a face thereof that is within the fields of view of the camera devices.

51. The portable touch system according to claim 46, wherein the flexible bezel includes a retro-reflecting coating on a face thereof that is within the fields of view of the camera devices.

52. The portable touch system according to claim 46, wherein the flexible bezel is collapsible when detached from the housing.

53. The portable touch system according to claim 49 wherein each camera device comprises an image sensor and associated processor, each processor processing image data acquired by the associated image sensor to identify an object appearing in captured image frames.

54. The portable touch system according to claim 53 further comprising processing structure receiving object data from the camera device processors and generating coordinates representing the position of the object within the region of interest.

* * * * *